United States Patent [19]

Ozga et al.

[11] Patent Number: 6,053,457
[45] Date of Patent: *Apr. 25, 2000

[54] TELECOMMUNICATION CABLING SUSPENSION SYSTEM FOR CEILING AND PLENUM AREAS

[76] Inventors: Jane E. Ozga; Sue E. Walker, both of 3525 S. Tamarac Dr. Suite 120, Denver, Colo. 80237

[*] Notice: This patent is subject to a terminal disclaimer.

[21] Appl. No.: 09/104,778

[22] Filed: Jun. 25, 1998

Related U.S. Application Data

[63] Continuation of application No. 08/602,658, Feb. 16, 1996, Pat. No. 5,782,440.

[51] Int. Cl.[7] .................................................. E21F 17/02
[52] U.S. Cl. .................................................. 248/58; 248/61
[58] Field of Search .................................. 248/49, 58, 61, 248/62, 68.1, 74.3; 211/119.1, 119.15; 242/395, 396.4; 24/68 R, 68 CD; 254/217, 218, 223

[56] References Cited

U.S. PATENT DOCUMENTS

| 666,960 | 1/1901 | Fuller et al. | 248/61 |
|---|---|---|---|
| 825,070 | 7/1906 | Peirce | 248/61 X |
| 1,477,596 | 12/1923 | Rhodes | 248/61 |
| 1,802,046 | 4/1931 | Bower | 248/61 |
| 1,873,357 | 8/1932 | St. John | 248/61 |
| 2,332,112 | 10/1943 | Pritchard | 248/61 |
| 2,586,048 | 2/1952 | Hyatt | 242/396.4 |
| 2,744,707 | 5/1956 | Peterson | 248/61 |
| 5,782,440 | 7/1998 | Ozga et al. | 248/58 |

*Primary Examiner*—Anita M. King
*Assistant Examiner*—Michael Nornberg
*Attorney, Agent, or Firm*—Ramon L Pizarro; Edwin H. Crabtree

[57] ABSTRACT

A system for holding a plurality of low voltage telecommunication cables, or other data transmission cable, together in a compact unit and attaching the cabling to a suspension wire held in tension. The suspension wire secured to various portions of a building structure such as a ceiling, a wall, floor joist, and the like. In a primary embodiment, the system includes at least two anchor eye bolts secured to the building structure in a spaced relationship to each other. An end of the suspension wire is attached a first anchor bolt and a second end of the suspension wire is attached to a tensioning ratchet. A ratchet handle is used for engaging the tensioning ratchet and tightening the suspension wire to a desired tension that will allow the wire to carry data telecommunications cable. Bundle tabs are wrapped around a portion of the cables and the suspension wire for securing the cables together and suspending the cables from the suspension wires. In another embodiment, a first suspension wire is threaded through a first wire vice attached to a first support beam and threaded through a second wire vice attached to a spaced apart second support beam. The tensioning ratchet is attached to one end of the first suspension wire and tension is applied to the first suspension wire between the first and second support beams.

15 Claims, 4 Drawing Sheets

TELECOMMUNICATION CABLING SUSPENSION SYSTEM FOR CEILING AND PLENUM AREAS

REFERENCE TO RELATED APPLICATIONS

This application is a continuation of my application having Ser. No. 08/602,658, filed Feb. 16, 1996, now U.S. Pat. No. 5,782,440.

BACKGROUND OF THE INVENTION (a) Field of the Invention

This invention relates to a system for suspending cable wires from a building structure and more particularly, but not by way of limitation, to a system for holding a plurality low voltage data and telecommunication cables held tightly together and suspending them from a suspension wire secured to the building structure.

(b) Discussion of Known Art

With the increased use of information processing equipment by society, there has been a rapidly increasing need to provide buildings with the necessary infrastructure to allow the occupants of a building the ability to take full advantage of available telecommunication and data transfer technology. Organizations will typically provide their employees with computers and other data processing equipment connected to mainframes, servers, and other data processing and communications equipment that is housed in the building or at a remote site. The installation and use of this equipment has made it necessary to install extensive data transfer cabling and wiring. This cabling is typically low voltage cable or fiber optic cable, which must be installed throughout the building. In the past, individual low voltage computer cables and wiring used for data communications networking, such as those used with a computer mainframe, servers and the like, have been threaded loosely together in walls and ceiling plenums of buildings. In situations where a large number of these cables are to be installed, the well known solution has been to install cable trays or ladder racks for carrying these cables throughout the building.

For small installations, the data transfer cables are typically simply routed through the plenum areas in ceilings or through crevasses between the building's walls. These installations simply route the cable over and around the building's existing systems and structure, often making contact with many of these installations. This type of installation gives little regard to the importance of placing the cables away from metallic structures that may build up electrical charges; electrical devices such as lights and motors; of holding the cables together as a unit for improved protection of the cable's insulation to avoid cold flow; and maintenance and inspection of the cables by the user. For installations with a large number of cables, the solution of installing a cable tray or electrical conduit for providing a system for support and routing has been the only reliable solution. However, cable trays are expensive to purchase and even more expensive to install. A typical installation of cable tray carries an average cost of five dollars per foot, making elaborate installations through large buildings extremely expensive. Moreover, cable trays are fairly large and require significant mounting structure and space within the building. Often, where installations are to be made in existing structures, the existing heating and air conditioning systems, sprinkler systems and electrical systems, must be avoided in order to prevent physical or electrical interference with the cable plant.

Electrical conduits are typically used in applications where a smaller quantity of cabling is to be installed. However, electrical conduit is also very expensive, costing on average about three dollars per foot to install. Moreover, conduit is further disadvantaged in that it typically does not allow visual inspection of the cabling contained therein, and suffers from a limited availability of space within the conduit. Another disadvantage of conduit is that a user's system may easily outgrow the carrying capabilities of the conduit, making it necessary to overhaul the entire system. Still another disadvantage is that if additional cabling needs to be added, and the conduit has space available for this cabling, then the cable must be pulled through the conduit, risking damage to the insulation and the cable itself.

For example, a high frequency telecommunications cable known as Electronic Industry Association/Telecommunications Industry Association (EIA/TIA) standard Category 5 or Underwriter's Laboratory (UL) Level 5 cable only allows for twenty five (25) pounds of tensile pull. If one exceeds this load one runs a serious risk of altering the capacitance of the cable. If the structural integrity of the cable is damaged, excessive attenuation and near-end crosstalk can also occur. Binding can occur when a cable is pulled tightly around a sharp object such as a support beam, hanging ceiling hardware, or ventilation equipment. Damage to the cable can range from a slight flattening of the cable pairs to complete sheath destruction and removal of individual conductor insulation (a symptom known as "a shiner"). These conditions cause the cable to test out of tolerance as specified by the EIA/TIA 568A and TSB 67 Standards.

Until recently, high speed data transfer systems were not widely available, therefore little emphasis has been placed on the protection of cables from extreme temperature changes and interference from surrounding electrical charges. This is largely due to the fact that conventional cables can easily transfer data for systems using data transfer speeds less than 10 megabits or 16 megahertz.

As the speed of data systems increases the demands on the performance of the cabling systems used to interconnect these systems increases. This is due to the fact that as the speed increases, the size of the pulses representing data get smaller. Small voltage pulses from, say, static charges or from installations within the plenums of the building can easily mimic real information pulses. Thus, care must be taken to ensure that the possibility of interference from these external sources be reduced in order to preserve the size, number, and shape of the information pulses being transmitted, so that receiving equipment can correctly interpret the information being conveyed.

The increased tolerance requirements of information cabling has prompted the introduction of more stringent standards. The requirements of the NEC EIA/TIA 568A Standards and TSB 67 Testing Criteria establish standard methods of cable support, bend radii of cable lines, linear installation support and cable routing in order to assure safe, reliable installations. These standards also include stricter cable protection and installation standards and testing criteria are essential for the proper operation of modern high speed networks.

It is not uncommon to find installations for 100 megabit and ATM (Asynchronous Transfer Mode) 155 megabit operation. These high speed systems require the use and availability of well insulated cabling which, as indicated earlier, is widely known as EIA/TIA Category 5 voice and data cabling systems. The expense and performance criteria imposed by these cable systems and high speed fiber optic systems has prompted telecommunications cabling manufacturers and systems installations experts to recognize a serious need for a cabling suspension system for ceilings and plenum areas in business, government and academic office environments, warehouses, plants, and training facilities.

New high speed cabling systems must be installed to insure that each cable run passes the stricter National Electric Code (NEC) standards, EIA/TIA 568A Standards and TSB 67 Testing Criteria. As stated earlier, cable support, bend radius, linearity of installation and cable protection are important factors that must now be addressed in order to pass the stricter installation and testing criteria. The sensitivity of high speed circuits to irregularities in the physical media (cable) caused by kinking, stretching, binding and general rough handling is very important. Also it is recognized that precise routing and even tight bundling of cable should be carefully controlled because these factors affect the integrity of the data being transferred. Thus, the installation should be placed away from sources of electromagnetic interference and radio frequency interference.

The problems associated with the support of cable has found many additional approaches, for example in U.S. Pat. No. 2,470,840 to Hain and U.S. Pat. No. 2,515,603 to Kaplan, electrical cable supports having split grommets or bushings are shown for holding a portion of a cable.

In U.S. Pat. Nos. 809,993 to Sorg, 1,164,613 to Jewell, 1,725,120 to Williams, 1,832,996 to Percival et al. and 4,973,259 different types of clamps or brackets are described for holding cable or wire and suspended from another parallel cable or conduit. Similarly, in U.S. Pat. No. 5,443,232 to Kesinger et al. an apparatus for hanging TV cable and the like is described using support brackets with rubber grommets for receiving a portion of coaxial cable therein.

The stricter standards and more stringent performance criteria of telecommunications cabling and fiber optic systems no longer permits simple weaving of the data transmission media through the plenum areas of buildings. However, none of the known prior art provides a reliable, inexpensive, easy to install, systems that can meet the strict performance criteria imposed by modern high speed data transfer systems. Moreover, the cost and physical requirements of installing cable trays and electrical conduit has imposed a heavy burden on those who wish to take advantage of the advancements offered by modern high speed data systems.

Thus there remains a need for a highly reliable, simple, and inexpensive system for installing and suspending telecommunications and data transfer cabling in buildings. Moreover, due to the need to avoid physical and electrical obstacles in a structure, there remains a need for a simple data cabling support system that allows precise placement of cable to be routed through buildings. Still further, there remains a need for a system that will reduce the risk of damage to the cabling being installed. Still further, there remains a need for a cabling support system that can be easily mastered by field personnel, and thus producing inexpensive, high quality, reliable installations of data transfer systems.

SUMMARY

An economical system that overcomes the problems unsolved by the prior art has been discovered for supporting and routing a plurality of low voltage telecommunication cables together in a compact unit and suspending these cables from a building structure. The system generally comprises of a first means for anchoring to a structure, a second means for anchoring a suspension wire to a structure, a suspension wire having a first end secured to the first means for anchoring the suspension wire to the structure, and tensioning means attached to a second end of the suspension wire and attached to the second means for anchoring to a structure. The system further includes the use of re-useable or non reusable cable ties to create bundles of cable to be routed and securing these bundles of cable to the suspension wire.

According to another aspect of the invention a method has been developed for installing and routing cabling within a plenum area in a building, the method generally comprising of installing a first means for anchoring to a structure, providing a second means for anchoring to a structure, providing a suspension wire having a first end and a second end, providing a tensioning means, attaching the first end of the suspension wire to the first means for anchoring to a structure, and attaching the second end of the suspension wire to a second end of the suspension wire to the tensioning means and attaching the tensioning means to the second means for anchoring to a structure, then bundling the cable to be routed next to the suspension wire and tying the bundled cable to the suspension wire. The bundling of the cable may be carried out with re-useable or non re-useable cable ties, depending on the projected needs of future cable additions.

Thus the system provides for holding a plurality of low voltage telecommunication cables together in a compact unit and attaching them to a suspension wire held in tension. The suspension wire secured to various portions of a building structure such as a ceiling, a wall, floor joist, and structures found in a building's plenum areas. In a preferred embodiment, the system includes at least two anchor eye bolts secured to the building structure and in a spaced relationship to each other. A first end of a suspension wire is attached to the first anchor bolt and a second end of the suspension wire is attached to a tensioning ratchet. A removable ratchet handle is used for engaging the tensioning ratchet and tightening the suspension wire thereon. A plurality of re-useable or non re-useable cable ties are wrapped around a portion of the data transmission cables and suspension wires for securing the data transmission cables together and suspending the cables from the suspension wire. In another embodiment, a first suspension wire is threaded through a first wire vice attached to a first support beam and threaded through a second wire vice attached to a spaced apart second support beam. A removable tensioning ratchet is attached to one end of the first suspension wire and tension is applied to the first suspension wire between the first and second support beams. The cables with cable ties are then suspended from the first suspension wire.

Thus in view of the foregoing, it can be appreciated that it is an object of the present invention to provide an improved method and system for suspending telecommunication cables and the like from a building structure such as a wall, a ceiling, support beams, floor joists, studs, and other means of suspension from structure typically found in plenum areas of buildings.

It is an object of the instant invention to provide a system and method for routing cables through the plenum areas, and for allowing precise placement of the telecommunication cables by supporting the cable bundle as a tight bundle against the suspension means, wire or cable.

Another object of the invention is to provide a suspension wire system which is attached to the building structure wherein the tension on the wire can be adjusted as additional cables are suspended therefrom.

Still another object of the system is to provide a suspension wire that can be attached to the building structure vertically, horizontally or at any angle to an axis of the structure. The suspension wire, by tightening the tension thereon, is capable of holding any number of cables over lengthy spans without the wire and cables sagging between anchor bolts or anchor beams.

Yet another object of the invention is to provide a system that allows bundling the data communication cables closely together so that the individual insulation jackets on each cable are protected. Also, to provide a system that allows the bundle of cables to be wrapped with an exterior wrap or jacket for protection from electrical and physical hazards. Further, improved isolation of the electrical transmission is provided by the bundling together of the cables as a unit.

Yet another object is to provide a simple data cabling support system that allows precise placement of cable to be routed through a building's plenum areas.

Another object is to provide a system that will reduce the risk of damage to the cabling being installed.

Another object is to provide a basic system that can form a basic "building block" that can be used to design and build extensive network support systems with a few, readily available parts.

Another of the many objects of this invention is to provide a cabling support system that can be easily mastered by field personnel, and thus producing inexpensive, high quality, reliable installations of data transfer systems.

Another object of the instant invention is a cable routing and support system which allows enhancement of the overall telecommunications system by minimizing the amount of metallic mass used to support the telecommunications cables and by routing the bundle of tightly held cables through areas in the ceiling plenum where electromagnetic radiation is least likely to be found.

These and other objects of the present invention will become apparent to those familiar with telecommunication systems, computer wiring, cable supports systems, and various methods of holding cables and supporting different types of cables and wiring when reviewing the following description, showing novel construction, combination, and elements as described, and more particularly defined by the appended claims, it being understood that changes in the precise embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which.

DESCRIPTION OF PREFERRED EMBODIMENTS

Figure 1:
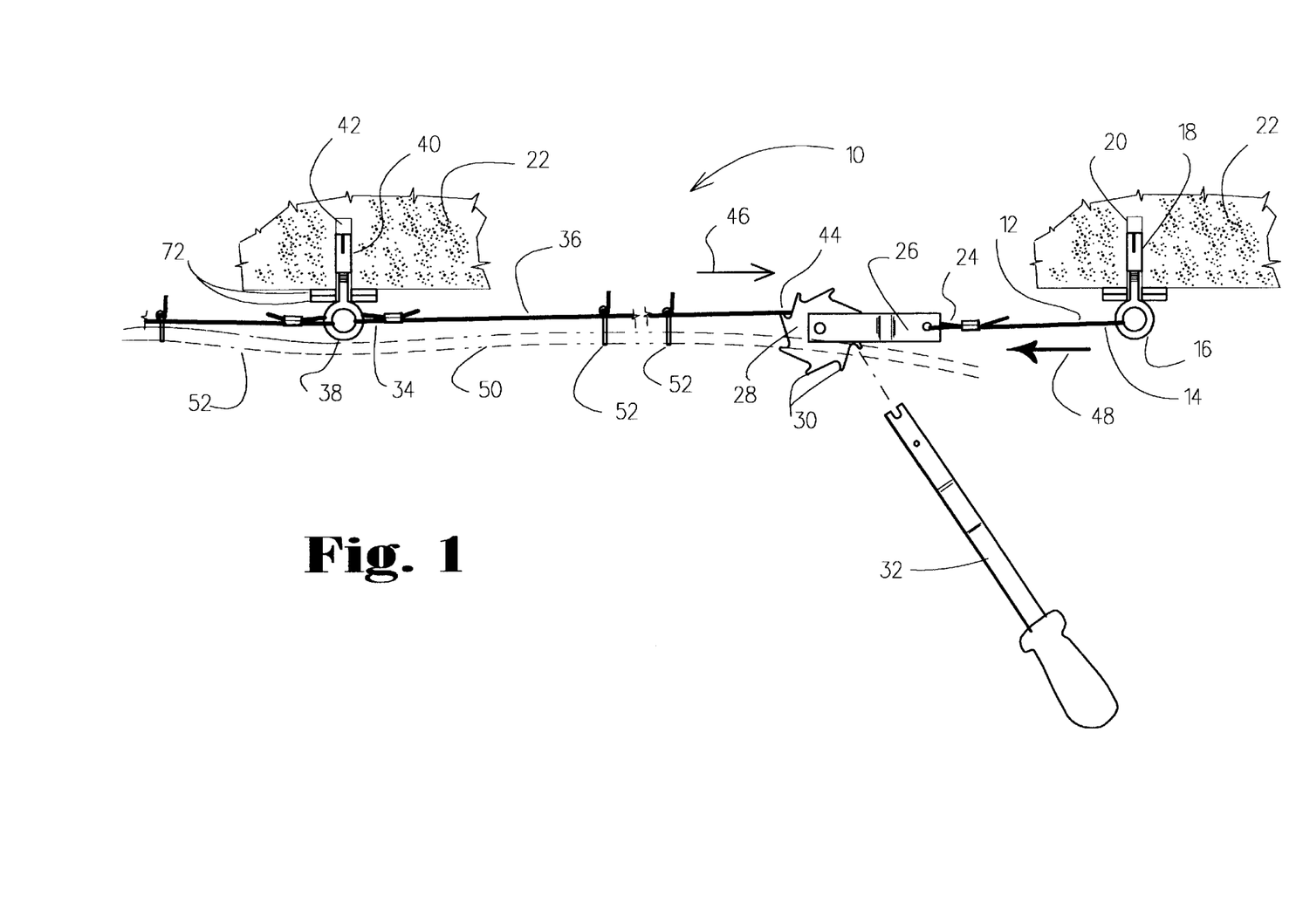
FIG. 1 is a front view of the subject system with a first and second suspension wire attached to anchor bolts and a tension ratchet attached to the two wire for applying tension thereon. A bundle of telecommunication cables are shown suspended from the second suspension wire.

In FIG. 1, a front view of a preferred embodiment of a system for holding a plurality of low voltage telecommunication cables together in a compact unit is shown. As used herein, the term "cable" or "cables" shall comprise telecommunications cable, data transfer cable and fiber optic cable. The system is designated by general reference numeral 10. The system 10 includes a first suspension wire 12 having a first end 14 attached to a first anchor bolt 16 (preferably ½ inch #25 forged steel shielded eyebolts) with an expandable nut 18 (preferably ½ inch RM-12 drop-in anchors) secured inside a hole 20 drilled into a portion of a concrete ceiling 22. In a preferred embodiment the suspension wire is 12.5 gauge stainless steel wire.

While the ceiling 22 is shown in the drawings, it should be kept in mind that the system 10 can be used equally well with a variety of support structures such as concrete walls, wood ceilings, wood floor joists, metal and wood beams and other like building structures. A second end 24 of the suspension wire 12 is attached a bracket 26 of a tensioning ratchet 28. The ratchet 28 includes a reel with pawls and tension teeth 30 used for gripping by a releasable handle 32. The reel for receiving a portion of a suspension wire thereon and the pawls are not shown in the drawings. A first end 34 of a second suspension wire 36 is attached to a second anchor bolt 38 with expandable nut 40 in a drilled hole 42. A second end 44 of the second suspension wire 36 is attached to and wrapped around the reel of the tensioning ratchet 28. When the handle 32 engages the tension teeth 30 and the reel is turned on the ratchet 28, the second end 44 of the second suspension wire 36 is tightened on the ratchet 28 as indicated by arrow 46. At the same time the first suspension wire 12 is tightened as indicated by arrow 48. In this manner proper tension is placed on the first and second suspension wires 12 and 36.

Figures 2, 3, 4, 5:
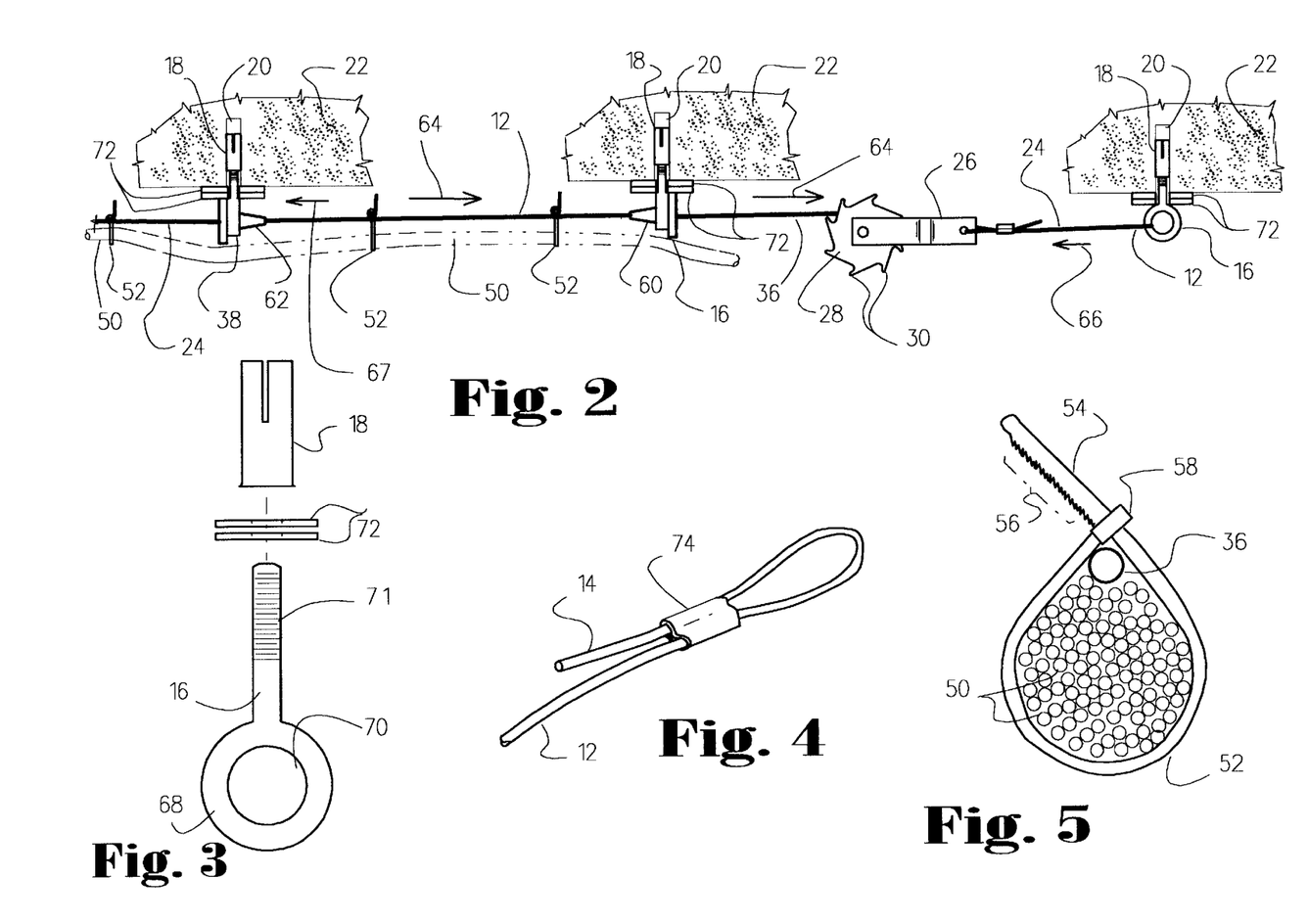
FIG. 2 is a front view similar to FIG. 1 but with a single first suspension wire threaded through a pair of tension vices attached to the anchor bolts. Cables are shown suspended from the first suspension cable.
FIG. 3 front view of one of the anchor bolts with washers and an expandable nut.
FIG. 4 is a perspective view of a portion of one end of a suspension wire clamped in a loop using a press sleeve.
FIG. 5 is an end view of a bundle of cables secured tightly together using a cable tie with ratchet type teeth for tightening the tab therearound.

Referring now to both FIGS. 1 and 5, a plurality of telecommunication cables 50 are shown secured together by a cable tie 52 having one end 54 with a series of gripping teeth 56 which are received through and engage one side of an opening in an opposite end 58 of the tie 52. As the tie 52 is drawn tightly around the cables 50, the gripping teeth 56 prevent the tie 52 from coming loose. Also shown in FIG. 5 is a portion of the second suspension wire 36 with cables 50 received therearound. By using a number of ties 52 in a spaced relationship to each other along the length of the cables 50, the cables 50 are suspended from the first and second suspension wires 12 and 36.

It is contemplated that the ties 52 be either re-useable plenum rated (which meet safety code standards) ties or non re-useable ties depending on the application. Re-usable, plenum rated ties are much more expensive than non reusable ties, but have better mechanical properties than non reusable ties, and, therefore may be preferred when installing large cable bundles to the system 10. Re-useable ties can be opened and closed to allow additional single or groups of cables 50 to be pulled and added to the original cable group bundles.

In a preferred embodiment of the system 10, ties 52 are placed every eight inches to one foot to secure cable groups 50 to the suspension wire. This prevents sagging of the cable groups 50, keeps the cables 50 linear and prevents problems with looping, such as found when attaching cables to the ceiling using well known commercial hangers.

If the overall weight of the cables 50 cause the wires 12 and 36 to sag between the anchor bolts 16 and 38, the second end 44 of the second suspension wire 36 can be tightened on the tensioning ratchet 28 using the handle 32 until the proper tension is applied to the wires 12 and 36 and the sag is eliminated. Through the use of the tensioning ratchet 28 proper tension can always be applied to the suspension wires 12 and 36 as different weights of cable are suspended thereon. While the first suspension wires 12 and 36 are shown in FIG. 1, it can be appreciated that a series of suspension wires can be used with different types of anchors attached to building support structures without departing from the spirit and scope of the invention.

In FIG. 2 an alternate installation of system 10 is shown using a first wire vice 60 received in an opening in the first anchor bolt 16 and a second wire vice 62 received in a opening in the second anchor bolt 38. A wire vice works in a manner wherein a suspension wire can be threaded through the wire vice in one direction but when the wire is pulled in an opposite direction it is gripped internally preventing movement of the wire in this direction. Using the first wire grip 60 as shown, a first end 14 of the first suspension wire 12 is threaded through the grip 60 from left to right as indicated by arrow 64. The wire 12 is gripped internally and held in place when tension is applied on the wire 12 as indicated by arrow 67. The second wire vice 62 is disposed in an opposite direction when compared to the first wire vice 60. A second end 24 of the first wire 12 is threaded from right to left as indicated by arrow 66 but is gripped internally when pulled in an opposite direction as indicated by arrow 64. By using the tensioning ratchet 28 attached to the second end 24 of the first wire 12, proper tension can be applied on the first wire 12 with tension held in place between the first and second anchor bolts 16 and 38 using the combination of the first and second wire vices 60 and 62. When the first wire 12 is properly tightened, the cables 50 with cable ties 52 can be suspended thereon as shown in FIG. 2. As mentioned above, should the system 10 begin to sag the tensioning ratchet 28 can be quickly attached, if needed, and increased tension applied to the first wire 12 for eliminating the sag.

In FIG. 3, an enlarged front view of anchor bolt 16 is shown having an annular head 68 with opening 70 and threaded shank 71. The bolt 16 includes washers 72 and the expandable anchor nut 18 for receiving the threaded shank 71. While the bolt 16 and nut 18 are shown in the drawings, it can be appreciated that various types of fasteners can be used equally well for securing and anchoring the suspension wires to portions of concrete and wood building structures.

Bundles of one hundred telecommunications cables, of about ninety meters in length, of Category 5, 4 or 3 are typical of the installations supported by the system 10. While attaching the telecommunications cable bundles 50 to the system 10 a problem arose with the hardware store version of the anchoring eye bolts which were being used.

It was found that the weight of the telecommunication cable bundles (100 cables tied in a bundle, which typically weigh two pounds per foot) was bending, breaking or straightening the anchoring eye bolts. The problem was solved by using solid steel heavy duty eye bolts supported at the base flange of the eye bolt by two or three washers 72. The washers 72 keep the eye bolt from bending and breaking as tension and weight is applied to the suspension wire.

In FIG. 4, a press sleeve 74 is shown for securing the first end 14 of the first suspension wire 12 to a portion of the wire 12 in a loop like manner. The sleeve 74 is used when the wire 12 is received through and around the opening 70 in the anchor bolt 16. When the press sleeve 74 is crimped, the loop of the first end 14 of the suspension wire 12 is held fast on the anchor bolt 16. The problem of maintaining the suspension wire's tensile strength overcome by the use of crimps, preferably crimps of the type sold under the trademark Nicopress brand crimps by the National Telephone Supply Co. of Cleveland, Ohio, to anchor the suspension wire at each end. Also, it was found that the suspension wire could also be attach to the tensioning ratchet 28 with the Nicopress brand crimps. Each of the Nicopress crimps is applied using a Nicopress brand crimping tool, also manufactured by the National Telephone Supply Co. of Cleveland, Ohio. It was found that this method of attachment allowed the system to develop the full potential of up to two thousand pounds of linear tensile strength with the 12.5 gauge stainless steel wire.

Figure 6:
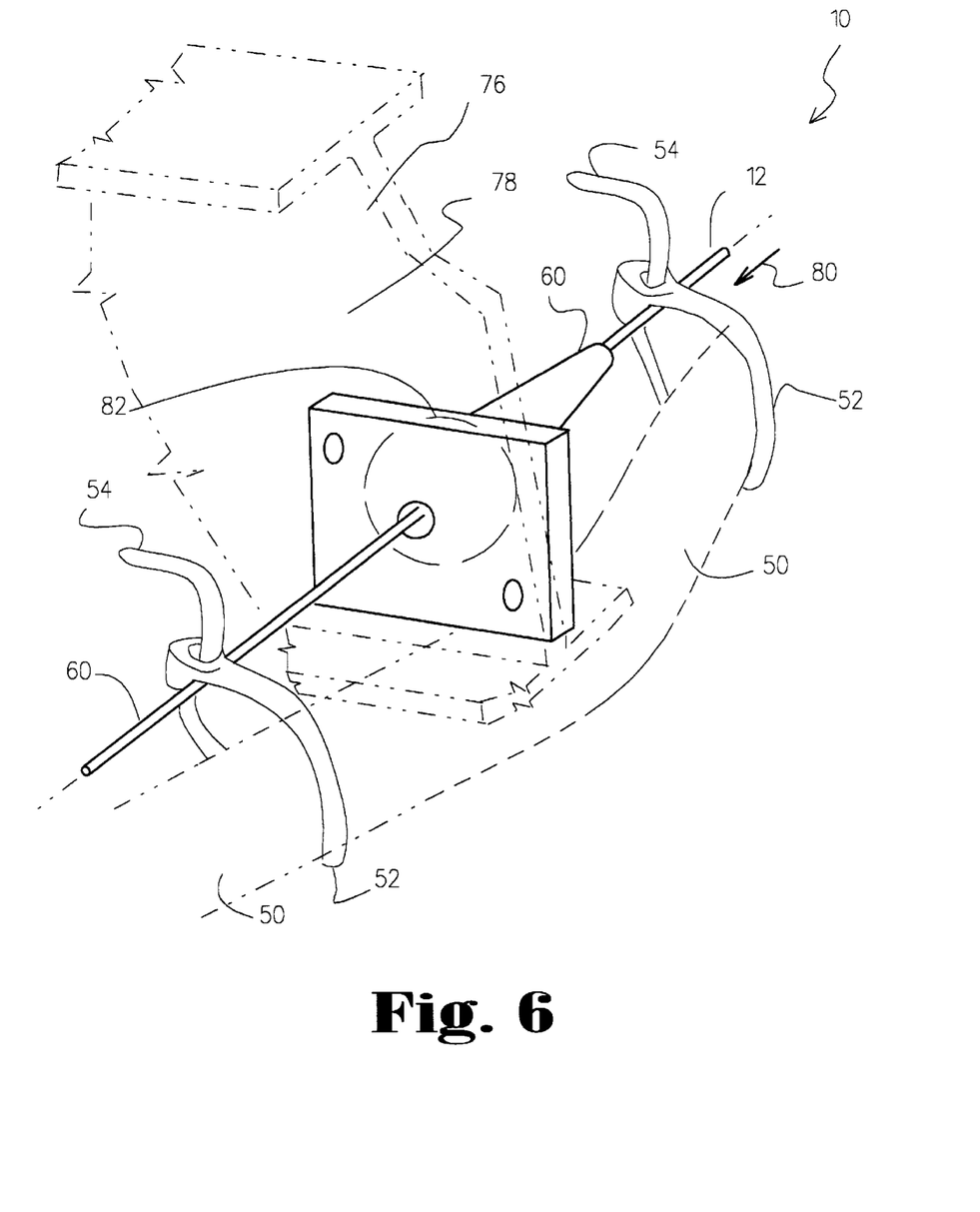
FIG. 6 is a perspective view of a portion of an I-beam support having a tension vice attached thereto and a suspension wire received through the tension vice and through a hole drilled in I-beam. The I-beam used for supporting the suspension wire and a bundle of cables.

In FIG. 6, the use of a metal I-beam 76 is incorporated into the system 10. The I-beam 76 is shown in phantom lines. In this drawing, the first wire vise 60 is attached to the side of a web 78 of the beam 76 with the first suspension wire 16 received through the vise 60 from right to left as indicated by arrow 80 and through a hole 82 drilled through the web 78 for receiving the wire 16. In this example, the beam 76 replaces the use of the anchor bolt 16. Two or more beams or a series of floor joists can be used for suspending various lengths of the first and second suspension wires 12 and 36 as shown in FIGS. 1 and 2. Also, the tensioning ratchet 28 would be used to increase tension on the wires 12 and 36 used in the system 10 as described above.

Figure 7:
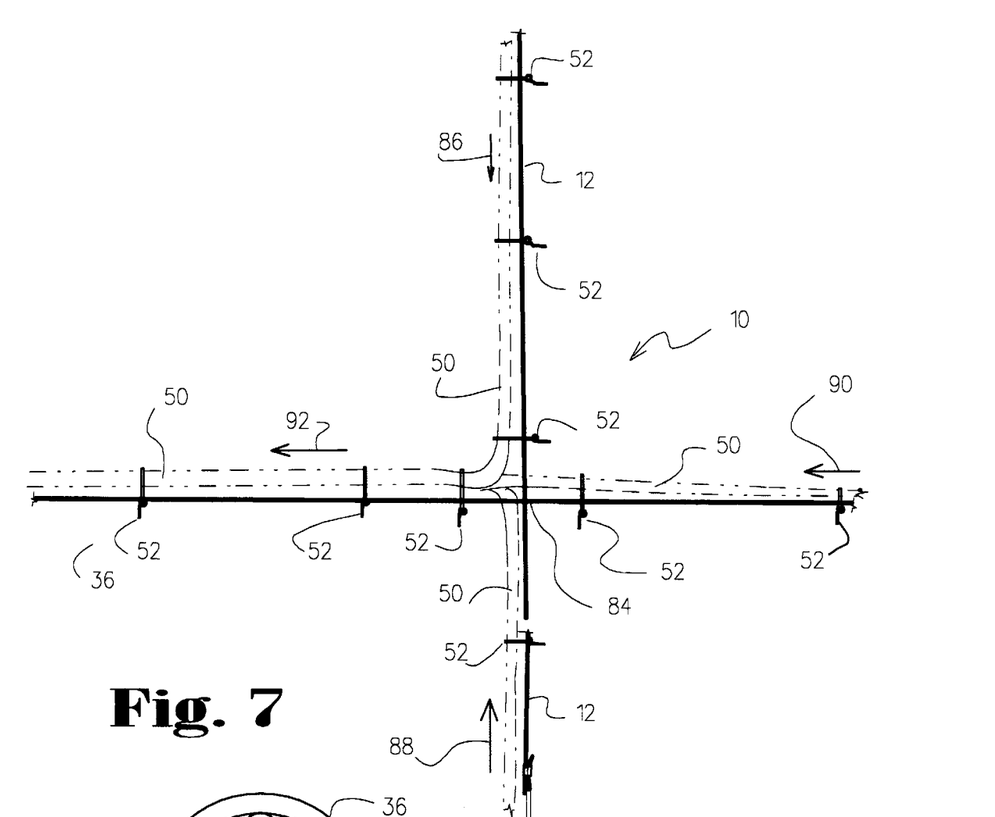
FIG. 7 is a top view of a network of cables suspended by a plurality of suspension cables.

In FIG. 7, a top view of the system 10 is shown wherein a network of cables 50 are suspended from the first suspension wire 12 which meets the second suspension wire 36 at right angles at an intersection 84. Cables 50 are suspended on the first suspension wire 12 and are feed toward the intersection 84 as indicated by arrows 86 and 88. Cables 50 are also suspended on the second suspension wire 36 and are feed toward the intersection 84 as indicated by arrow 90. At the intersection 84, the cables on both the first suspension wire 12 and the second suspension wire 36 are joined and suspended from a right portion of the second suspension wire 36 as indicated by a large arrow 92. In this example, different cables 50 can be feed from three separate locations in a building on the suspension wires and then transported to a telecommunications closet for serving all of the equipment attached to the individual cables. Clearly, because of the increased number of cables 50 supported by the second suspension wire 36, if the wire 36 should begin to sag or bow the tension ratchet 28 as shown in FIG. 1 can be used to increase the tension thereon.

Figure 8:
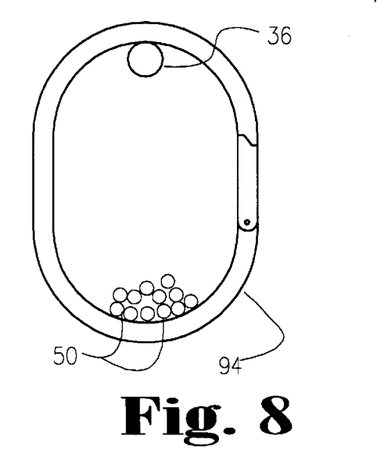
FIG. 8 illustrates the use of a carabiner as a means for sliding cables along the suspension wire during installation of the network.

Referring now to FIG. 8, which illustrates a method for pulling eight to twelve cables 50 at a time quickly without damaging the cables themselves. Once the system 10 has been installed in a desired grid pattern, the suspension wire offers a pathway free of obstructions that can be utilized to pull groups of cables 50 along the suspension wire quickly and easily. It has been found that by using a device known as a rock climbing carabiner 94 as a means for sliding cables along said suspension wire one can carry groups of cables 50 along the system 10 in order to speed up and facilitate the bundling and installation of the cables 50.

Although other carriage type devices may be used to pull cables 50 along the system network 10, the carabiner 94 is a readily available item that can be easily attached and detached from the system 10 while pulling cable groups 50. Moreover it has been found that when the carabiner 94 is used to pull the cable groups 50 along the system 10, little or no resistance was encountered, making the installation of the cable 50 without the risk of damaging the cable 50 a relatively easy operation. Testing of this method demonstrated that additional carabiners 94 could be attached to the system 10 and to the cable groups 50 being installed, allowing the installation of 75 to 100 meters of cable 50 with ease.

While the invention has been particularly shown, described and illustrated in detail with reference to the preferred embodiments and modifications thereof, it should be understood by those skilled in the art that the foregoing and other modifications are exemplary only, and that equivalent changes in form and detail may be made therein without departing from the true spirit and scope of the invention as claimed, except as precluded by the prior art.

We claim:

1. A system for routing and suspending a plurality of telecommunication cables together from a ceiling in a plenum area in a building structure to support a telecommunications cabling network within the plenum area, the system comprising:

a first suspension means having a first wire, the first wire having a first end and a second end, the first end of said first wire including means for attachment to the ceiling in the plenum area and said second end of said first wire having means adapted for attachment to the building structure, and a first tensioning means attached along the wire, so that tension may be applied and adjusted along said first suspension means;

a second suspension means having a second wire having a first end and a second end, wherein the first end of said second wire includes means for attachment to the ceiling in the plenum area and said second end of said second wire is attached to having means adapted for attachment to the building structure, and a second tensioning means attached along the wire, so that tension may be applied and adjusted along said second suspension means, said second suspension means being at an angle to said first suspension means;

means for securing the plurality of telecommunication cables together against the first suspension means and against the second suspension means, so that the telecommunications cables may be used as a telecommunications distribution network in the plenum area.

2. The system as described in claim 1, wherein each of said first and second tensioning means comprises a tensioning ratchet.

3. The system as described in claim 1, wherein said means for securing the plurality of telecommunications cables have been adapted for securing fiber optic communications cables.

4. The system as described in claim 1 and further comprising at least one wire vise attached to said first suspension means between the said first end and the second end of said first suspension means.

5. The system as described in claim 4 and further comprising at least one wire vise between the said first end and the second end of said second suspension means.

6. A system for routing and suspending a plurality of telecommunication cables together from a ceiling in a plenum area in a building structure to support a telecommunications cabling network within the plenum area, the system comprising:

a first suspension means having a first wire, the first wire having a first end and a second end, the first end of said first wire including means for attachment to the ceiling in the plenum area and said second end of said first wire being attached to means adapted for attachment of the first wire to the building structure, the first wire being stressed to a first level of tension;

a second suspension means having a second wire having a first end and a second end, wherein the first end of said second wire is attached to the means for attachment to the ceiling of said first suspension means and said second end of said second wire is attached to means adapted for attachment to the building structure, the second wire being stressed to a second level of tension, the first level of tension and the second level of tension causing the first wire and the second wire to maintain a straight line between the first end of the first wire and the second end of the first wire and the first end of the second wire and second end of the second wire when the first wire is under a running load from a plurality of telecommunications cables and the second wire is under a running load from a plurality of telecommunications cables, and said second suspension means being at an angle to said first suspension means;

means for securing the plurality of telecommunication cables together against the first suspension means and against the second suspension means, so that the telecommunications cables may be used as a telecommunications distribution network in the plenum area.

7. The system as described in claim 6, and further comprising a first tensioning means positioned along said first wire to provide and adjust said first level of tension and a second tensioning means positioned along said second wire to provide and adjust said second level of tension, so that the alignment of the first wire and the alignment of the second wire is maintained as telecommunications cabling are added, the alignment being maintained by increasing the first level of tension or the second level of tension as telecommunications cables are attached to the first wire or second wire.

8. The system as described in claim 6, wherein said means for securing the plurality of telecommunications cables have been adapted for supporting fiber optic communications cables.

9. The system as described in claim 6 and further comprising at least one wire vise connected to the said first suspension means at a location between the said first end and the second end of said first suspension means.

10. The system as described in claim 9 and further comprising at least one wire vise between the said first end and the second end of said second suspension means.

11. A method for creating a route and for suspending a plurality of telecommunication cables together near a ceiling in a plenum area in a building structure to support a telecommunications cabling network within the plenum area, the method comprising:

providing a first suspension means having a first wire, the first wire having a first end and a second end;

providing a means for attaching the first suspension means to the ceiling;

attaching the first end of the first wire to the means for attachment to the ceiling;

providing a tensioning means;

attaching the tensioning means to the building and to the second end of the first wire of the first suspension means;

tightening the first wire of the first suspension means;

providing a second suspension means having a second wire having a first end and a second end;

attaching the first end of the second wire to the ceiling in the plenum area near the first end of the first wire of the first suspension means;

providing a second tensioning means and attaching the second tensioning means to the building;

attaching the second end of the second wire to the second tensioning means, and tightening and adjusting the tension along said second suspension means with the second tensioning means, said second suspension means being at an angle to said first suspension means;

providing means for securing the plurality of telecommunication cables together against the first suspension means; and providing means for securing the plurality of telecommunication cables together against the second suspension means, so that the telecommunications cables can be supported from the first suspension means and the second suspension means as a telecommunications distribution network in the plenum area.

12. The method as described in claim 11, wherein each of said first and second tensioning means comprises a tensioning ratchet.

13. The method as described in claim 11, wherein said means for securing the plurality of telecommunications cables have been adapted for supporting fiber optic communications cables.

14. The method as described in claim 11, and further comprising providing at least one wire vise between the first end and the second end of said first suspension means and boosting the tension along the first suspension means by pulling the wire through the wire vise.

15. The method as described in claim 14, and further comprising providing at least one wire vise between the said first end and the second end of said second suspension means and boosting the tension along the second suspension means by pulling the wire through the wire vise.

* * * * *